United States Patent
Herdle

(10) Patent No.: US 9,650,893 B2
(45) Date of Patent: May 16, 2017

(54) IMAGING-BASED INTERFACE SENSOR AND CONTROL DEVICE FOR MINING MACHINES

(75) Inventor: David Kevin Herdle, Franklin, PA (US)

(73) Assignee: Joy MM Delaware, Inc., Wilmington, DE (US)

( * ) Notice: Subject to any disclaimer, the term of this patent is extended or adjusted under 35 U.S.C. 154(b) by 886 days.

(21) Appl. No.: 13/078,660

(22) Filed: Apr. 1, 2011

(65) Prior Publication Data

US 2012/0253584 A1 Oct. 4, 2012

(51) Int. Cl.
E21C 27/10 (2006.01)
E21C 35/08 (2006.01)
E21C 27/24 (2006.01)

(52) U.S. Cl.
CPC .............. *E21C 27/10* (2013.01); *E21C 27/24* (2013.01); *E21C 35/08* (2013.01)

(58) Field of Classification Search
USPC ...................... 701/28, 523; 299/1.05, 1.1, 29
See application file for complete search history.

(56) References Cited

U.S. PATENT DOCUMENTS

| | | | |
|---|---|---|---|
| 3,421,796 A * | 1/1969 | Barrett | 299/59 |
| 4,115,688 A | 9/1978 | Fertl et al. | |
| 5,161,857 A | 11/1992 | Mayercheck et al. | |
| 5,310,248 A * | 5/1994 | King et al. | 299/1.1 |
| 5,334,838 A | 8/1994 | Ramsden, Jr. | |
| 5,871,260 A | 2/1999 | Delli-Gatti, Jr. | |
| 5,939,986 A | 8/1999 | Schiffbauer et al. | |
| 6,247,538 B1 | 6/2001 | Takeda et al. | |
| 6,296,317 B1 * | 10/2001 | Ollis et al. | 299/1.4 |
| 6,435,619 B1 | 8/2002 | Frederick et al. | |
| 6,452,163 B1 | 9/2002 | Frederick et al. | |
| 6,591,216 B1 | 7/2003 | Magnussen | |
| 6,612,655 B2 | 9/2003 | Schwoebel et al. | |
| 6,666,521 B1 | 12/2003 | Pease et al. | |
| 6,781,130 B2 | 8/2004 | Frederick et al. | |
| 6,810,353 B2 | 10/2004 | Schiffbauer | |

(Continued)

FOREIGN PATENT DOCUMENTS

| | | |
|---|---|---|
| CN | 201730617 | 2/2011 |
| EA | 011331 B1 | 2/2009 |

(Continued)

OTHER PUBLICATIONS

Search Report from the United Kingdom Intellectual Property Office for Application No. 1206114.9 dated Aug. 22, 2012 (3 pages).

(Continued)

*Primary Examiner* — Aaron L Troost
(74) *Attorney, Agent, or Firm* — Michael Best & Friedrich LLP

(57) ABSTRACT

Systems, methods, and computer-readable medium containing instructions for controlling mining machines. One system includes an image sensor for capturing an image of a cutting face of a mine and interface sensing and control system for obtaining the image, identifying an anomaly in the image, calculating a distance between the anomaly and a reference, and using the distance to automatically instruct a mining machine control system to keep a cutter head of the mining machine within a seam.

26 Claims, 7 Drawing Sheets

(56) References Cited

U.S. PATENT DOCUMENTS

| | | | |
|---|---|---|---|
| 7,076,346 | B2 | 7/2006 | Sturges et al. |
| 7,360,844 | B2 | 4/2008 | Frederick et al. |
| 7,420,471 | B2 | 9/2008 | Frederick et al. |
| 7,496,228 | B2* | 2/2009 | Landwehr et al. ........... 382/170 |
| 7,567,704 | B2 | 7/2009 | Au et al. |
| 7,865,285 | B2 | 1/2011 | Price et al. |
| 2002/0150308 | A1* | 10/2002 | Nakamura ................... 382/286 |
| 2004/0151364 | A1 | 8/2004 | Kenneway et al. |
| 2005/0063565 | A1 | 3/2005 | Nagaoka et al. |
| 2007/0219720 | A1 | 9/2007 | Trepagnier et al. |
| 2009/0212216 | A1* | 8/2009 | Hargrave et al. ............. 250/332 |
| 2009/0279772 | A1 | 11/2009 | Sun et al. |
| 2010/0063648 | A1 | 3/2010 | Anderson |
| 2010/0221071 | A1 | 9/2010 | Hinshaw et al. |
| 2010/0259091 | A1 | 10/2010 | Hackelboerger et al. |
| 2011/0010094 | A1 | 1/2011 | Simon |
| 2011/0282581 | A1 | 11/2011 | Zeng |
| 2012/0074759 | A1 | 3/2012 | Weigel |

FOREIGN PATENT DOCUMENTS

| | | |
|---|---|---|
| EP | 1396833 A1 | 3/2004 |
| GB | 2358704 | 8/2001 |
| RU | 2242159 C1 | 12/2004 |
| SU | 601414 A1 | 4/1978 |
| SU | 883419 A1 | 11/1981 |
| SU | 977771 A1 | 11/1982 |

OTHER PUBLICATIONS

Search Report from the United Kingdom Intellectual Property Office for Application No. 1205462.3 dated Jul. 13, 2012 (3 pages).
Improving Continuous Miner Safety (2005), http://www.coalnews.net/view.php?id=8 (2 pages).
David Chirdon, "MSHA Proximity Detection" (Feb. 2, 2009),11 pages.
Engineering Considerations and Selection Criteria for Proximity Warning Systems for Mining Operations (last updated Feb. 22, 2011), http://www.cdc.gov/niosh/mining/topics/electrical/pws-selection.htm (18 pages).
Office Action from the U.S. Appl. No. 13/078,650 dated Dec. 24, 2012 (27 pages).
Office Action from the U.S. Appl. No. 13/078,650 dated Jul. 18, 2013 (9 pages).
AU2012201854 First Office Action from the Australian Intellectual Property Office dated Mar. 21, 2014 (6 pages).
Stauffer, C. et al., "Similarity templates for detection and recognition", Proceedings of the 2001 IEEE Computer Society Conference on Computer Vision and Pattern Recognition (CVPR 2001), 2001, 1:1-221 to 1-228.
Taboada-Crispi, A. et al., "Experimental system for image anomaly detection based of features and distances", Proceedings of CIE 2007, Jan. 2007, pp. 1-4.
Patent Examination Report No. 1 from the Australian Intellectual Property Office for Application No. 2012201855 dated Jan. 23, 2014 (3 pages).
Patent Examination Report No. 2 from the Australian Intellectual Property Office for Application No. 2012201855 dated Apr. 17, 2014 (5 pages).
Patent Examination Report No. 3 from the Australian Intellectual Property Office for Application No. 2012201855 dated Aug. 11, 2014 (5 pages).
Search Report from the United Kingdom Intellectual Property Office for Application No. 1206114.9 dated Nov. 5, 2014 (5 pages).
Office Action from the Patent Office of the Russian Federation for Application No. 2012113269 dated Jan. 25, 2016 (4 pages).
Office Action from the Patent Office of the Russian Federation for Application No. 2012113268 dated Aug. 17, 2015 (4 pages).
Office Action from the Patent Office of the Russian Federation for Application No. 2012113268 dated Jan. 11, 2016 (4 pages).
Final Office Action from the U.S. Appl. No. 13/078,650 dated Oct. 22, 2015 (9 pages).
First Office Action from the Polish Patent Office for Application P-398666 dated Oct. 7, 2015 (10 pages).
2nd Office Action from the Polish Patent Office for Application P-398666 dated May 4, 2016 (6 pages).
First Office Action from the Polish Patent Office for Application P-398665 dated Oct. 7, 2015 (9 pages).
2nd Office Action from the Polish Patent Office for Application P-398665 dated May 6, 2016 (3 pages).

* cited by examiner

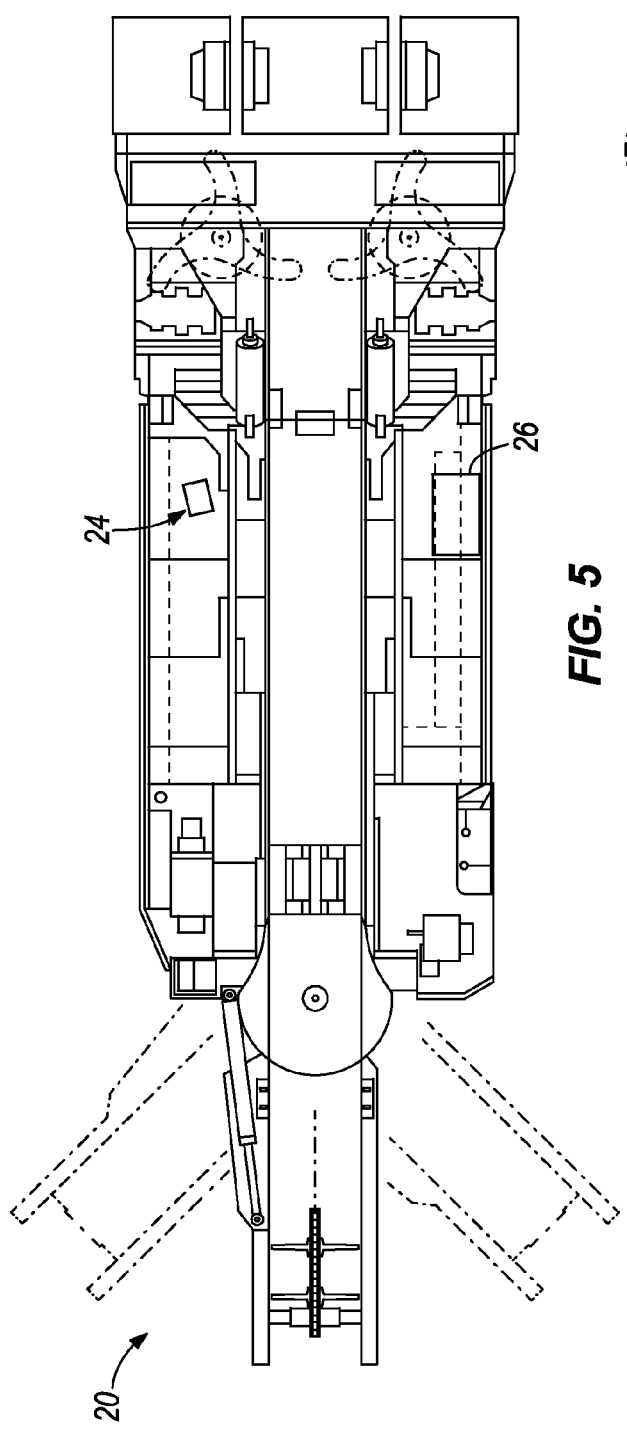
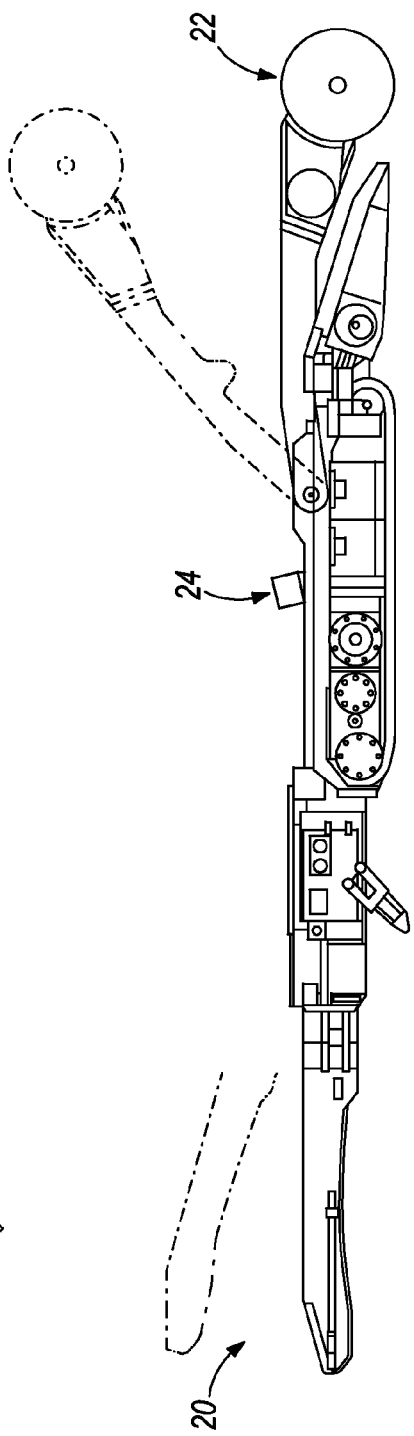

IMAGING-BASED INTERFACE SENSOR AND CONTROL DEVICE FOR MINING MACHINES

FIELD OF THE INVENTION

Embodiments of the invention relate to methods and systems for controlling a mining machine.

SUMMARY OF THE INVENTION

Coal and other minerals are typically mined from underground deposits. The mineral deposits are positioned as seams in the ground. Various types of mining machines can be used to remove the mineral deposits. A longwall shearer has a face of approximately 1,000 feet (300 meters) or more. The shearer includes one or more rotating drums that move mechanically back and forth across a mineral seam. The loosened material falls onto a pan line that takes the material to a conveyor belt for removal. Longwall shearers can include a hydraulic roof support system that advances with the mining machine. As the shearer moves forward, overlying rock that is no longer supported by the roof system falls behind the shearer.

Continuous miners can also be used to remove mineral deposits from mines. Continuous miners include a large rotating steel drum equipped with bits or teeth that scrape minerals from a seam. Conveyor systems included in the continuous miner or separate equipment (e.g., shuttle cars) transport removed mineral from the seam. Remote-controlled continuous miners can be used to work in a variety of difficult seams and conditions.

Regardless of the mining machine or method used, as a mining machine bores into a cutting face of a mine, a mineral seam must be tracked and followed to ensure that as much of the mineral deposit as possible is removed from the seam and that the minimum amount of material adjacent to the seam is removed. Doing so improves the productivity of the machine. In some cases, mining machines use radio wave reflections or gamma emissions to track a seam.

One embodiment of the invention provides a system for controlling a mining machine. The system includes an image sensor for capturing an image of a cutting face of a mine and an interface sensing and control system. The interface sensing and control system obtains the image, identifies an anomaly in the image, calculates a distance between the anomaly and a reference, and uses the distance to automatically instruct a mining machine control system to keep the cutter head of the mining machine within a seam.

Another embodiment of the invention provides a computer-implemented method for controlling a mining machine. The method includes obtaining an image of a cutting face of a mine with an image sensor, identifying an anomaly in the image, calculating a distance between the anomaly and a reference, and using the distance to automatically keep a cutter head of the mining machine within a seam.

Still another embodiment of the invention provides non-transitory computer-readable medium encoded with a plurality of processor-executable instructions for controlling a miner having a cutter head. The instructions include obtaining an image of a cutting face of a mine with an image sensor, identifying an anomaly in the image, calculating a distance between the anomaly and a reference, and using the distance to automatically keep a cutter head of the mining machine within a seam.

Other aspects of the invention will become apparent by consideration of the detailed description and accompanying drawings.

BRIEF DESCRIPTION OF THE DRAWINGS

FIGS. 5-6 schematically illustrate the continuous miner of FIG. 4.

DETAILED DESCRIPTION

Figure 1:
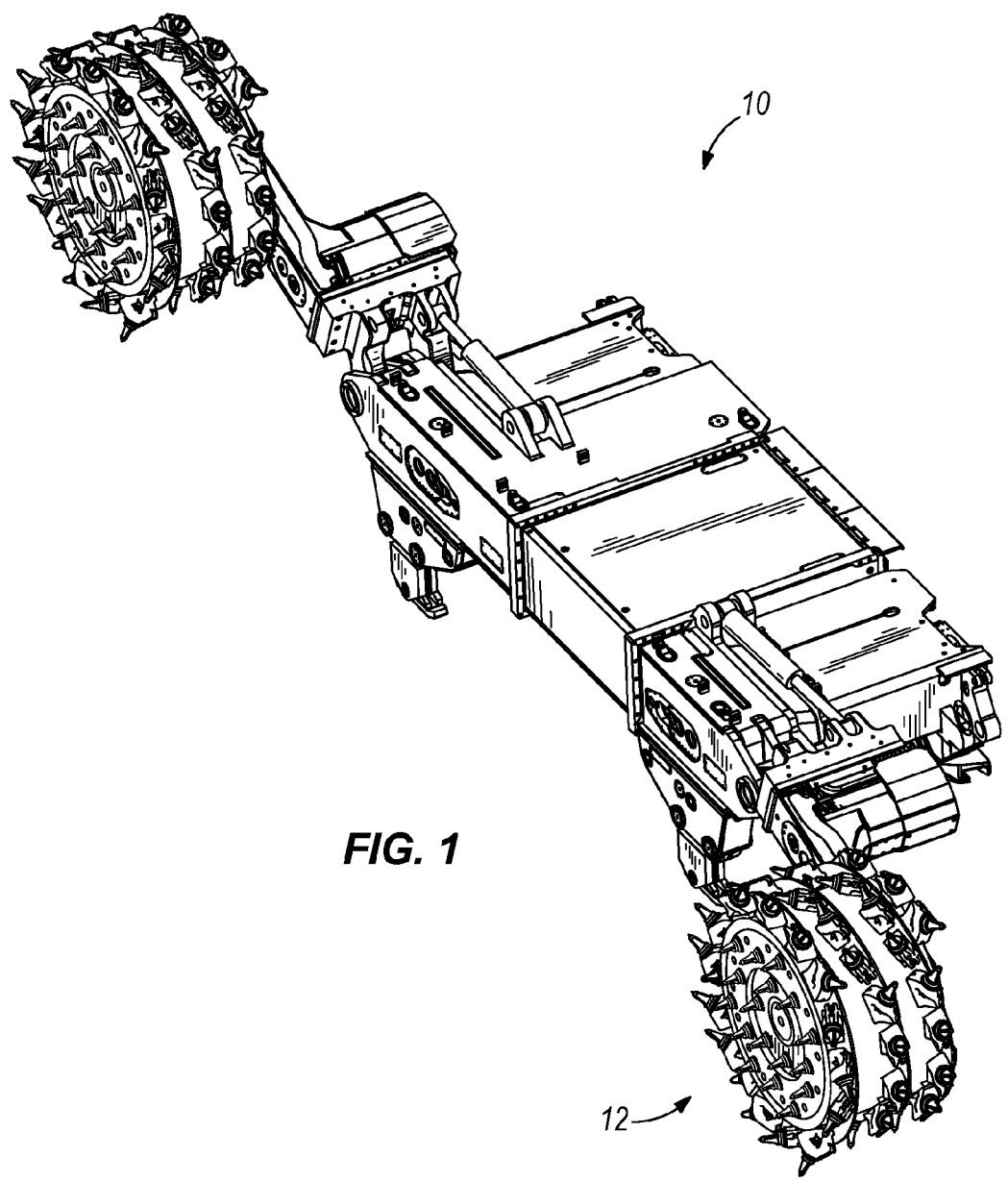
FIG. 1 is a perspective view of a longwall shearer according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium). As such, it should be noted that a plurality of hardware and software based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible.

As described above, staying within a seam is a challenge for operators of mining machines, and knowing where the seam is and staying out of the surrounding strata in the mine roof or floor is important to ensure that the mined product is high quality. This challenge becomes even harder with remote-controlled machines as the operator has a harder time seeing the face being cut by the mining machine.

Many operators keep a mining machine in a seam by positioning the mining machine's cutter head relative to an anomaly, such as a rock or clay band, that the operator manually identifies in the seam. As described in more detail below, embodiments of the present invention use one or more image sensors, such as cameras, thermal imagers/cameras, etc., to take images of the cutting face near the cutter head and identify an anomaly within a seam (e.g., a band in the seam). The distance between the anomaly and a reference, such as the roof or the floor is then calculated. Once this distance is calculated it can be displayed to the operator so that the operator can use the information to control the mining machine. Alternatively or in addition, the calculated distance and other information obtained from the images can be provided to a mining machine control system to automatically keep the cutter head within a seam.

Figure 2:
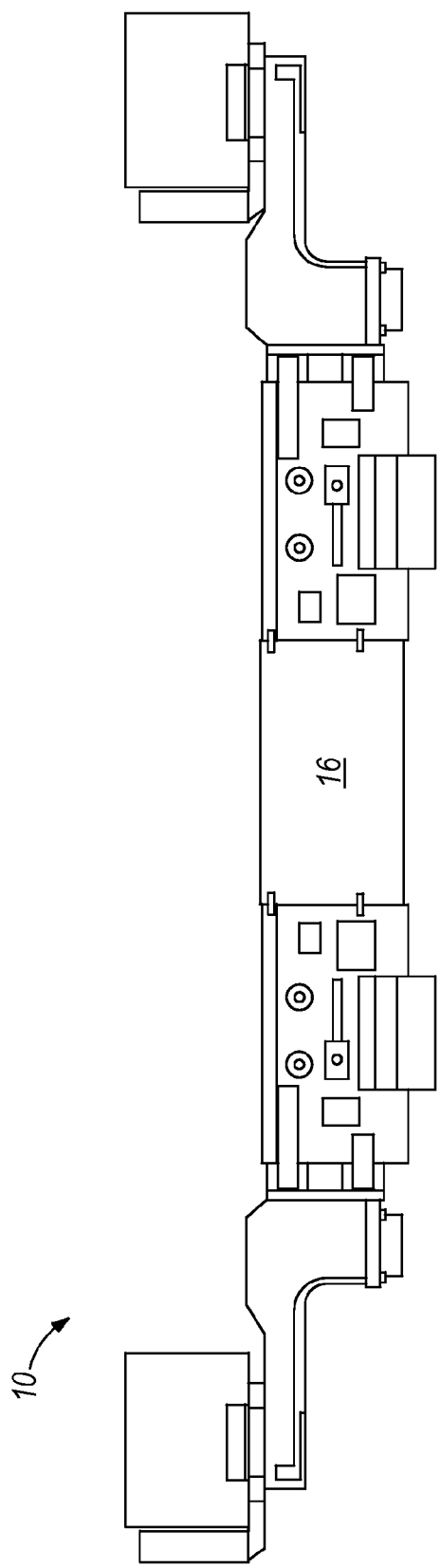
FIGS. 2-3 schematically illustrate the longwall shearer of FIG. 1.
Figure 3:
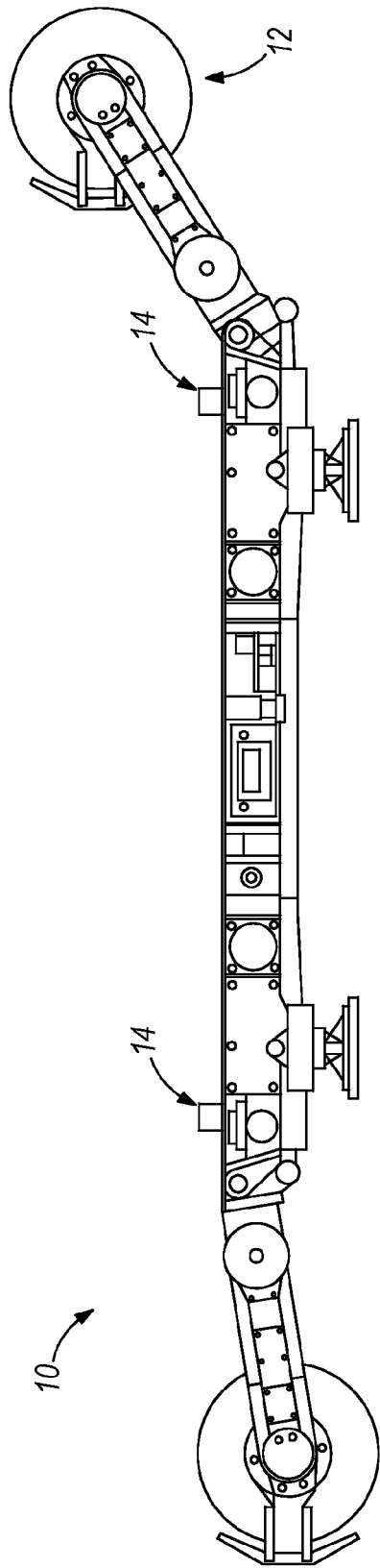
Figure 4:
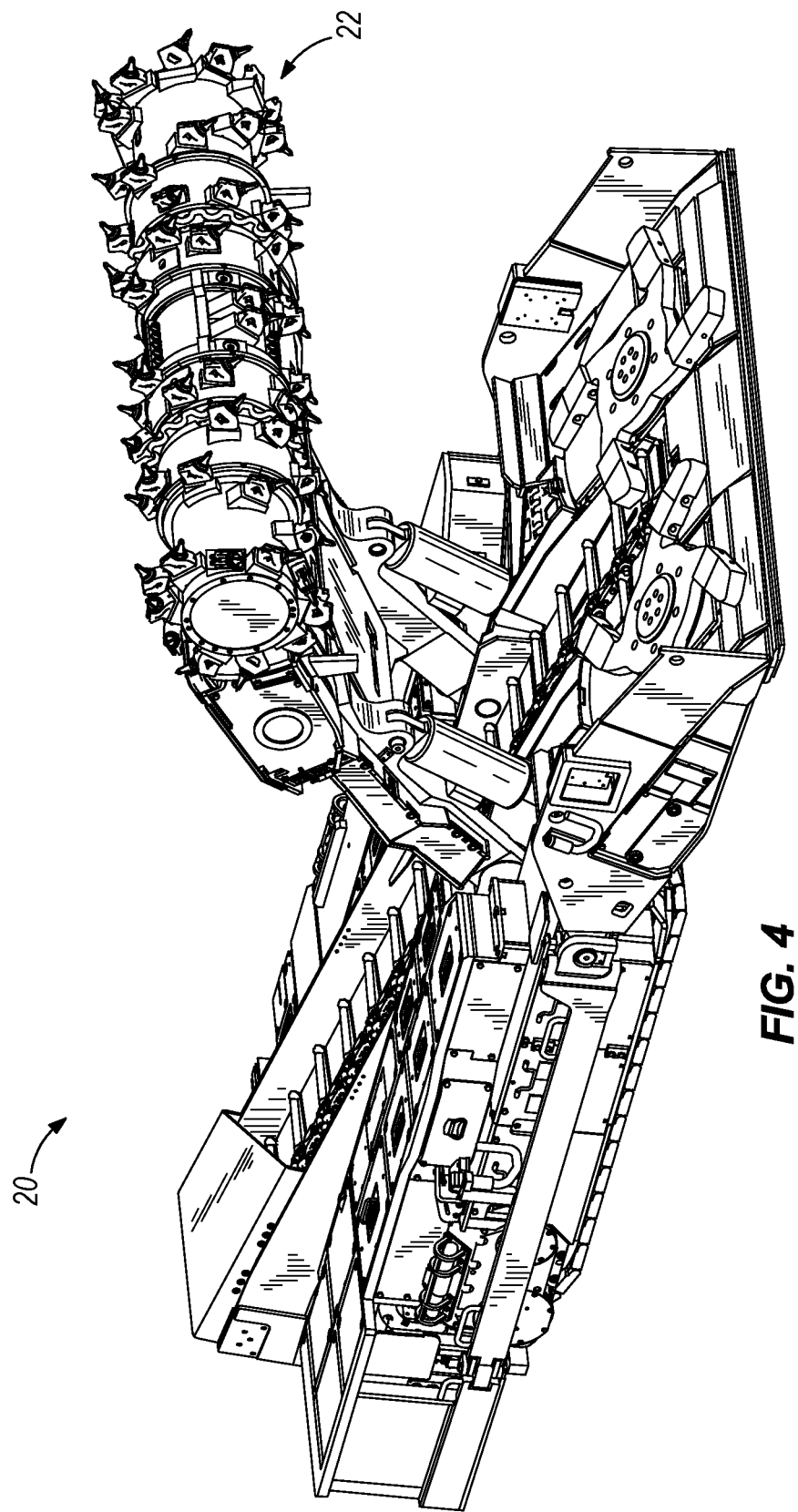
FIG. 4 is a perspective view of a continuous miner according to one embodiment of the invention.
Figure 7:
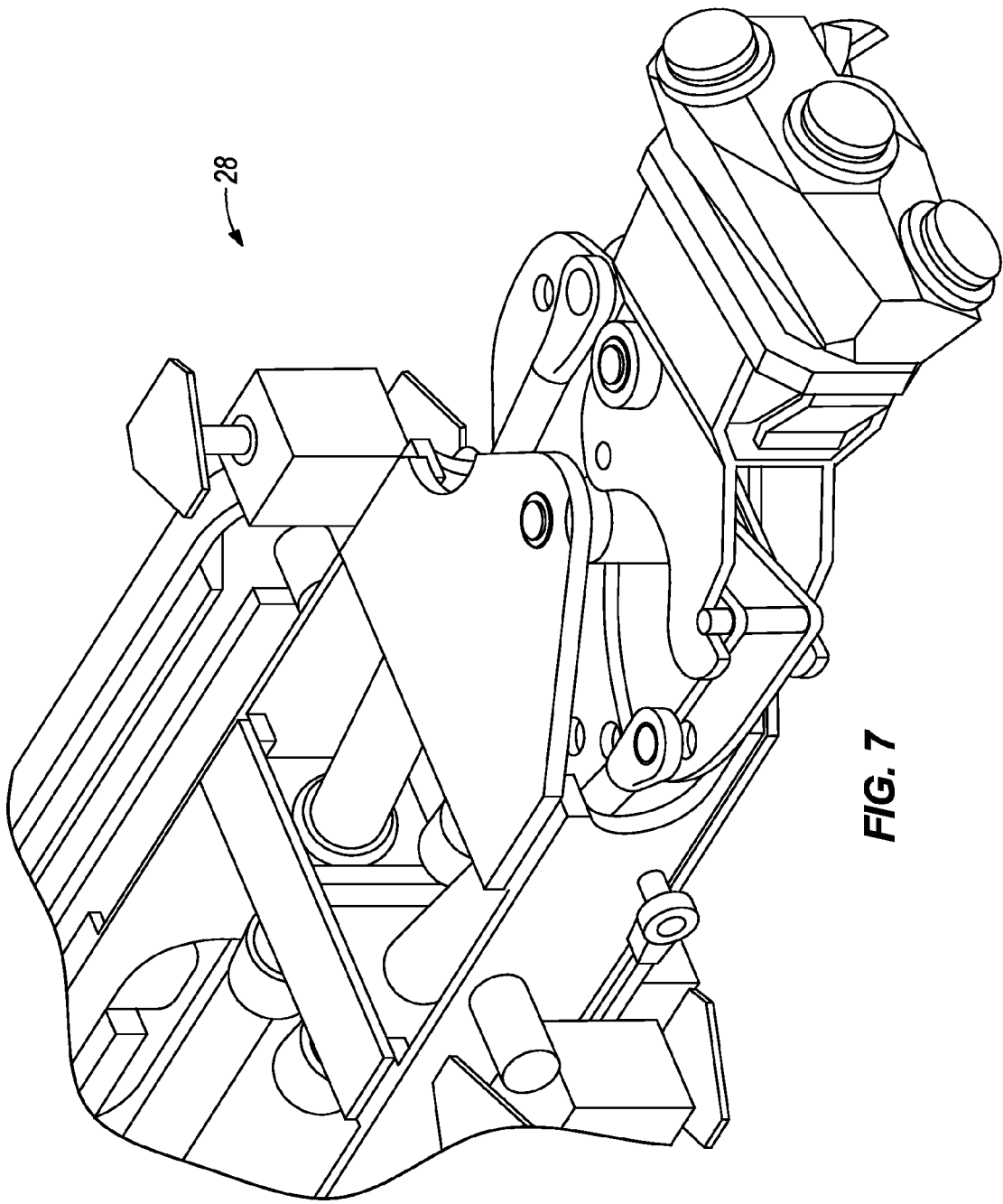
FIG. 7 is a partial perspective view of a hard rock continuous miner according to one embodiment of the invention.

FIGS. 1-3 illustrate a longwall shearer 10 according to one embodiment of the invention. The shearer 10 includes a cutter head 12 and an image sensor 14 at each end of the mining machine (see FIG. 3). The cutter head 12 can be controlled by a mining machine control system 16. Each image sensor 14 can be pointed at the cutting face near the cutter head 12. Similarly, FIG. 406 illustrate a continuous miner 20 according to one embodiment of the invention. The continuous miner 20 includes a cutter head 22 and an image sensor 24 located on one or both sides of the miner 20. The cutter head 22 can be controlled by a mining machine control system 26. Each image sensor 24 can be pointed at the ribs near the cutter hear 22. It should be understood that the miners illustrated in FIGS. 1-6 are merely examples of miner and that the methods and systems disclosed herein can be used with various types of miners in various configurations. For example, FIG. 7 illustrates a hard rock continuous miner ("HRCM") 28 that can include image sensors similar to the sensors 24 included in the continuous miner 20.

The image sensors 14 and 24 can include a camera (still or video) or a thermal camera or sensor. The image sensors 14 and 24 are connected to an interface sensing and control system. The interface sensing and control system can be included in the mining machine. However, in some embodiments, the interface sensing and control system can be included in a device separate from the mining machine, such as other mining machinery or a control panel used by an operator to control the mining machine. Furthermore, in some embodiments, the functionality performed by the interface sensing and control system can be distributed between multiple devices. The interface sensing and control system can have built-in frame grabbers or the frame grabbers may be built into the image sensors 14 and 24. The image sensors 14 and 24 can be interfaced to the interface sensing and control system via a communication interface, such as a high speed firewire. As described below with respect to FIG. 9, images from the image sensor 14 and 24 are obtained by the interface sensing and control system and processed.

Figure 8:
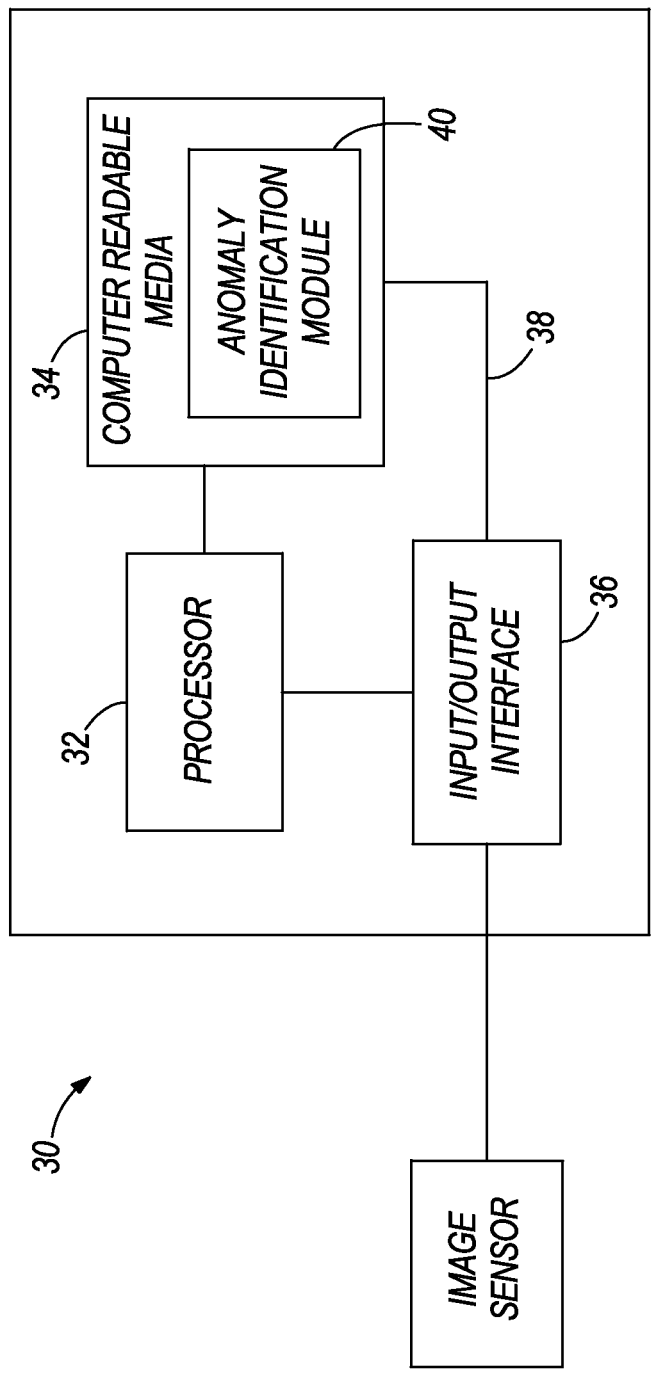
FIG. 8 schematically illustrates an interface sensing and control system for the mining machines of FIGS. 1-7.

FIG. 8 schematically illustrates an interface sensing and control system 30 according to one embodiment of the invention. It should be understood that FIG. 8 illustrates only one example of components of an interface sensing and control system 30 and that other configurations are possible. As shown in FIG. 8, the control system 30 includes a processor 32, computer-readable media 34, and an input/output interface 36. The processor 32, computer-readable media 34, and input/output interface 36 are connected by one or more connections 38, such as a system bus. It should be understood that although only one processor 32, computer-readable media module 34, and input/output interface 36 are illustrated in FIG. 8, the control system 30 can include multiple processors 32, computer-readable media modules 34, and input/output interfaces 36. Also, the functionality provided by the interface sensing and control system 30 can be distributed among multiple controllers or systems or can be combined with other controllers or systems. For example, in some embodiments, the interface sensing and control system 30 can be combined with the mining machine control systems 16 and 26 that control the cutter heads 12 and 22. Some of the functionality performed by the interface sensing and system 30 can also be performed by the image sensors 14 and 24.

The processor 32 retrieves and executes instructions stored in the computer-readable media 34. The processor 32 can also store data to the computer-readable media 34. The computer-readable media 34 can include non-transitory computer readable medium and can include volatile memory, non-volatile memory, or a combination thereof. In some embodiments, the computer-readable media 34 includes a disk drive or other types of large capacity storage mechanism.

The input/output interface 36 receives information from outside the control system 30 and outputs information outside the control system 30. For example, as shown in FIG. 8, the input/output interface 36 can receive images from an image sensor, such as the image sensors 14 and 24 described above. The input/output interface 36 can also transmit signals, data, instructions, and queries to mechanical and electrical equipment located outside the control system 30 that operate and control the cutter head or other components of the mining machine, such as the mining machine control systems 16 and 26.

The instructions stored in the computer-readable media 34 can include various components or modules configured to perform particular functionality when executed by the processor 32. For example, the computer-readable media 34 can include an anomaly identification module 40, as shown in FIG. 8. The anomaly identification module 40 can be executed by the processor 32 to identify an anomaly in the material face. This information can then be provided to the operator or used to automatically control the mining machine to keep the cutter head within a seam.

Figure 9:
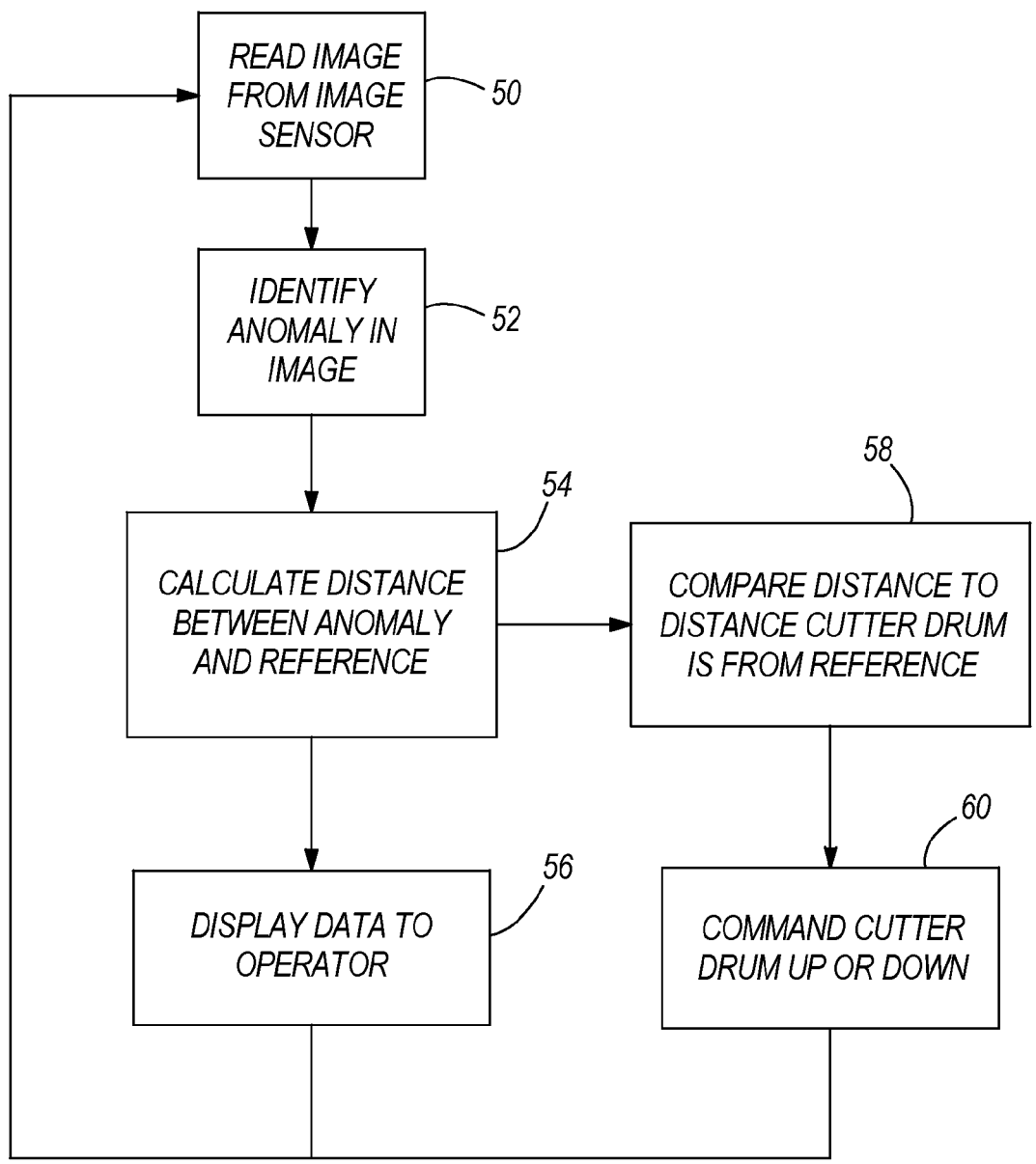
FIG. 9 is a flow chart illustrating a method performed by the interface sensing and control system of FIG. 8 to identify a seam in a cutting face.

FIG. 9 is a flow chart illustrating a method performed by the system 30 when the anomaly identification module 40 is executed by the processor 32 according to one embodiment of the invention. As shown in FIG. 9, during operating of a mining machine, images are read from the image sensors 14 and 24 (at 50). The images are then digitized and analyzed to identify an anomaly (at 52). As described above, an anomaly can include a rock or clay band within a seam. The anomaly can be identified in the images using edge detection technology or pre-taught image comparisons. For example, the interface sensing and control system 30 can be calibrated or trained using images of known anomalies in various faces. Therefore, the control system 30 can compare obtained images to images of known anomalies to identify one or more anomalies in the images obtained from the image sensors 14 and 24.

Once the anomaly and the corresponding seam are identified, the control system 30 calculates the distance between the anomaly and a reference (at 54). The reference can include the mine roof or the mine floor or can include a marker (e.g., a reflective marker) placed in the mine. The reference can also include the mining machine or a portion thereof. In some embodiments, this distance can be calculated using a known distance between an image sensor and the cutting face or rib and the known pixel sizes of the images. In other embodiments, the distance between the image sensor and the cutting face or rib can be calculated. To calculate this distance, an image sensor can use a light source. For example, U.S. Pat. No. 6,296,317, the entire contents of which are hereby incorporated by reference, describes a method for calculating such a distance using various light sources. In particular, the method disclosed in U.S. Pat. No. 6,296,317 uses a camera that has a filter that picks up only light having the wavelength of a diffused light source and a light strip source. The camera captures an image of an interior surface of a mine and a computer digitizes the image and separates the image into first and second, or even and odd, data fields. The even data fields show the image illuminated by the diffused light source, and the odd data fields show the image illuminated by the striping light source. The odd data field can then be used to determine the distance between the camera and the interior surface of the mine. In some embodiments, calculating the distance between the image sensor and the cutting face or rib is performed when a continuous miner is used in a box/slab cut process where this distance is not readily known.

After the distance between the anomaly and the reference is calculated (at 54), the distance and other information obtained about the anomaly and/or the seam (e.g., images of the anomaly) can be provided to an operator (at 56) (e.g., on an interface or monitor on the mining machine or as part of a report generated and provided to the operator). In some embodiments, such as when an operator is operating a remote-controlled mining machine, the interface sensing and control system 30 can transmit this information (e.g., over a wired or wireless communication channel, such as an Ethernet connection or a local area network) to an interface located near the operator rather than an interface on the mining machine itself. The operator can use the information provided by the interface sensing and control system 30 to modify operation of the mining machine to keep the mining machine within a seam. Alternatively or in addition, the interface sensing and control system 30 can compare the calculated distance to the distance between the cutter head and the reference (at 58). The result of this comparison can be provided to an operator and/or can be used to automatically control the mining machine to ensure that the cutter head remains within the seam (at 60). In particular, the interface sensing and control system 30 can output commands to various components of the mining machine (e.g., using the input/output interface 36), such as the mining machine control systems 16 and 26, to automatically modify the position of the cutter head (e.g., the height of the cutter head). As described above, in some embodiments, the interface sensing and control system 30 can be included as part of the mining machine control systems 16 and 26 and, therefore, the same system performs the distance comparison and controls the mining machine to modify the position of the cutter head. As shown in FIG. 9, the method can be repeated as the mining machine is operating to continually track the position of the anomaly and to ensure that the cutter head is properly positioned within the seam.

The images and other data obtained by or generated by the interface sensing and control system 30 can be stored in a memory module, such as the computer-readable media 34 or an external memory module. The stored images and data can be used as a log for operation of the mining machine. Also, the stored images and data can be used to calibrate or train the interface sensing and control system 30. For example, the stored images can be used to teach the control system 30 characteristics of anomalies, which allows the control system 30 to better identify anomalies and corresponding seams.

Various features and advantages of the invention are set forth in the following claims.

What is claimed is:

1. A system for controlling a mining machine, the system comprising:
an image sensor for capturing an image of a cutting face of a mine;
an interface sensing and control system for obtaining the image, identifying an anomaly in the image by comparing the image to a plurality of images of known anomalies, calculating a distance between the anomaly and a reference using a known distance between the image sensor and the cutting face and a known size of pixels in the image, and using the distance to automatically instruct a mining machine control system to keep a cutter head of the mining machine within a seam.

2. The system of claim 1, wherein the interface sensing and control system identifies the anomaly in the image by identifying a band in the image.

3. The system of claim 2, wherein the band includes a clay band.

4. The system of claim 2, wherein the band includes a rock band.

5. The system of claim 1, wherein the reference includes at least one of a roof of the mine and a floor of the mine.

6. The system of claim 1, wherein the reference includes a marker placed in the mine.

7. The system of claim 1, wherein the interface sensing and control system uses the distance to instruct a mining machine control system to keep a cutter head of the mining machine within a seam by comparing the distance between the anomaly and the reference and a distance between the cutter head and the reference.

8. The system of claim 1, wherein the interface sensing and control system provides the image to an operator.

9. The system of claim 1, wherein the interface sensing and control system provides the distance to an operator.

10. The system of claim 1, wherein the image sensor includes a video camera.

11. The system of claim 1, wherein the image sensor includes a still camera.

12. The system of claim 1, wherein the image sensor includes a thermal camera.

13. A computer-implemented method for controlling a mining machine, the method comprising:
obtaining an image of a cutting face of a mine with an image sensor;
identifying an anomaly in the image by comparing the image to a plurality of images with known anomalies;
calculating a distance between the anomaly and a reference using a known distance between the image sensor and the cutting face and a known size of pixels in the image; and
using the distance to automatically keep a cutter head of the mining machine within a seam.

14. The method of claim 13, wherein identifying an anomaly in the image includes identifying a band in the image.

15. The method of claim 14, wherein identifying the band includes identifying a clay band in the image.

16. The method of claim 14, wherein identifying the band includes identifying a rock band in the image.

17. The method of claim 13, wherein calculating the distance includes calculating a distance between the anomaly and at least one of a roof of the mine and a floor of the mine.

18. The method of claim 13, wherein calculating the distance includes calculating a distance between the anomaly and a marker placed in the mine.

19. The method of claim 13, further comprising providing the image to an operator.

20. The method of claim 13, further comprising providing data about the anomaly to an operator.

21. The method of claim 13, wherein using the distance to keep a cutter head of the mining machine within a seam includes comparing the distance between the anomaly and the reference and a distance between the cutter head and the reference.

22. Non-transitory computer-readable medium encoded with a plurality of processor-executable instructions for controlling a mining machine having a cutter head, the instructions comprising:
   obtaining an image of a cutting face of a mine with an image sensor;
   identifying an anomaly in the image by comparing the image to a plurality of images of known anomalies;
   calculating a distance between the anomaly and a reference based on a known distance between the image sensor and the cutting face and a known size of pixels in the image; and
   using the distance to automatically keep a cutter head of the mining machine within a seam.

23. The computer-readable medium of claim 22, wherein the instructions for identifying the anomaly include instructions for identifying the anomaly in the image using edge-detection technology.

24. The computer-readable medium of claim 22, wherein the instructions for calculating the distance includes instructions for calculating a distance between the anomaly and at least one of a roof of the mine and a floor of the mine.

25. The computer-readable medium of claim 22, wherein the instructions for calculating the distance includes instructions for calculating a distance between the anomaly and a marker placed in the mine.

26. The computer-readable medium of claim 22, wherein the instructions for using the distance to keep a cutter head of the mining machine within a seam include instructions for comparing the distance between the anomaly and the reference and a distance between the cutter head and the reference.

* * * * *